June 24, 1941. E. C. WIEGMANN 2,247,267
MEASURING AND CONTROL APPARATUS
Filed Dec. 9, 1937
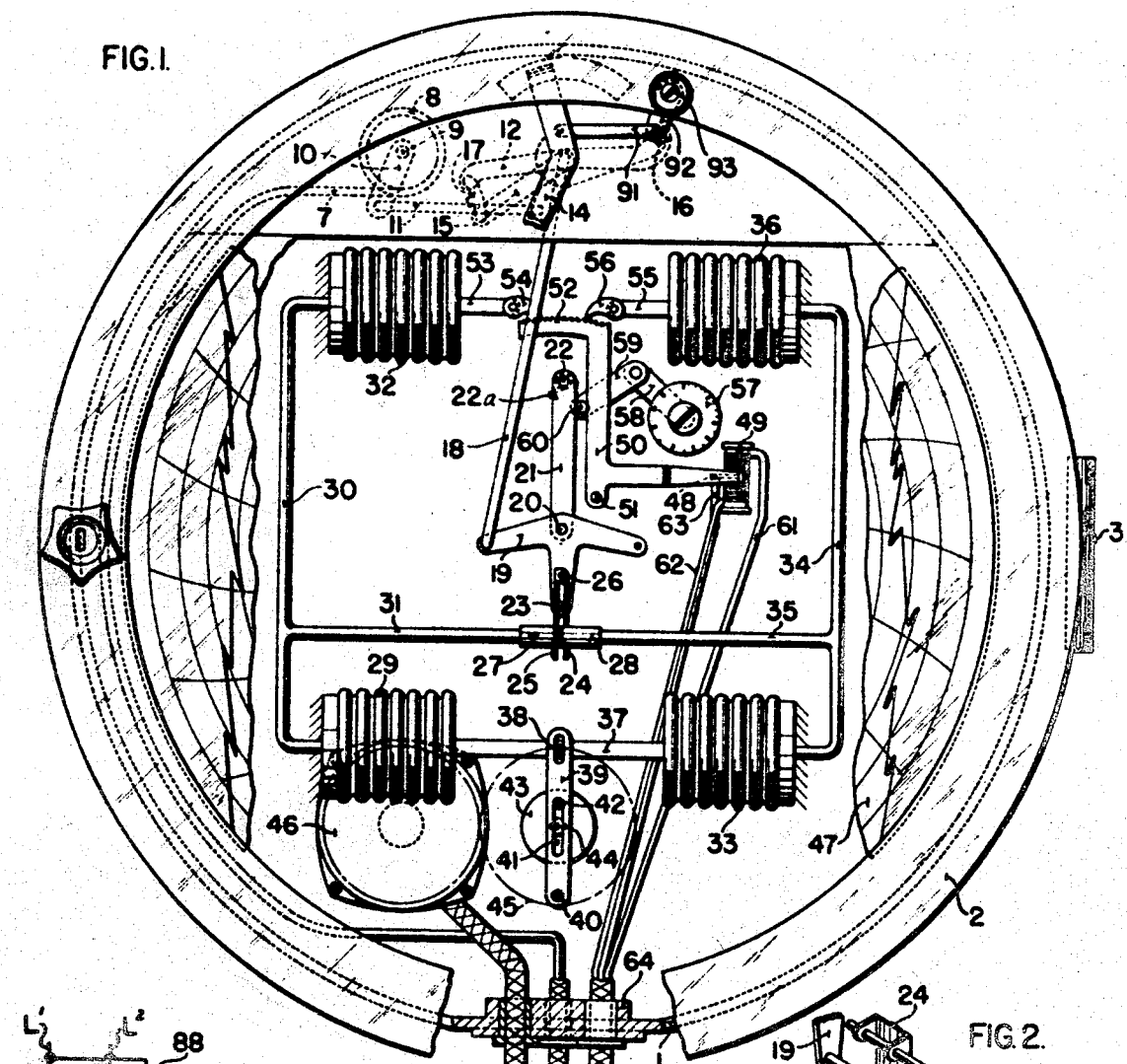
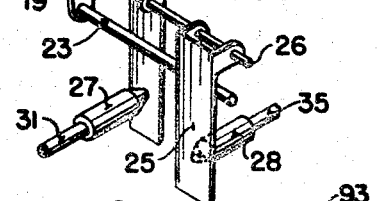
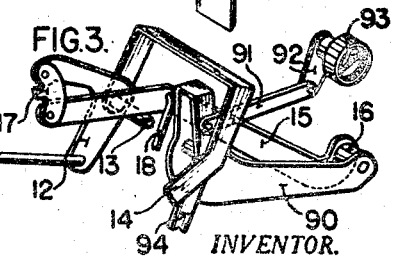
INVENTOR.
EDWIN C. WIEGMANN
BY George M. Muschamp
ATTORNEY Patented June 24, 1941

2,247,267

UNITED STATES PATENT OFFICE 2,247,267

MEASURING AND CONTROL APPARATUS

Edwin C. Wiegmann, Philadelphia, Pa., assignor to The Brown Instrument Company, Philadelphia, Pa., a corporation of Pennsylvania Application December 9, 1937, Serial No. 178,911

17 Claims. (Cl. 236—82)

The present invention relates to measuring and control instruments of the type that are used to measure a variable such as pressure or temperature and to control the condition being measured so that it may be kept at some predetermined value. In general the device disclosed herein pertains to a self contained instrument in which a novel pneumatic relay is used to vary the setting of a so-called proportioning system that in turn controls the positioning of a valve which varies the value of the condition being measured.

More specifically my invention includes a pair of bellows that are alternately expanded and compressed to act as a compressor to supply air which actuates a relay in accordance with the value of the condition relative to a desired value thereof. This relay in turn moves a contact along a resistance of a balanced electrical circuit of the proportioning system to unbalance the same. This unbalance is in turn used to energize a motor which regulates a valve controlling the condition and rebalances the circuit.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

In the drawing:

Fig. 1 is a view including an elevation of a control instrument with parts broken away and including a diagrammatic representation of furnace control provisions external to the instrument and cooperating with the instrument to maintain predetermined temperature conditions.

Fig. 2 is a perspective view showing the arrangement of the flappers and nozzles.

Fig. 3 is a perspective view showing a portion of the apparatus shown in Fig. 1.

In the invention my improved control instrument comprises mechanism located in an instrument casing 1, which may be of any conventional instrument casing size and form, and includes a front door 2, with a hinge connection 3 between the door and casing body, said instrument being employed to adjust the fluid fuel supply valve 4 of a furnace or heater 5, as required to maintain a predetermined furnace temperature to which the device 6 is responsive. As shown, the device 6 is the bulb of a fluid pressure thermometer, the pressure of which is transmitted by a tube 7 to the stationary end of a Bourdon tube helix 8 forming part of the instrument mechanism. The free end of the helix 8 gives angular movements about a shaft 9, coaxial with the helix, to a crank arm 10 as the thermometer temperature increases or decreases. The angular movements of arm 10 shift link 11 and oscillate bell-crank 12 about shaft 13 to which it is attached, to thereby oscillate a pen arm 14 whose upper end is formed as a yoke, the other leg of which is also attached to shaft 13. Oscillation of bell crank 12 about its axis also oscillates lever 15 about its support 16 by means of link 17, and thereby gives longitudinal movement to a flapper valve adjusting link 18. The latter connects lever 15 to a floating lever 19, which is pivotally connected at 20 to a supporting lever 21, the latter being pivotally supported at 22 and biased in a counter-clockwise direction by spring 22a.

The lever 19 thru a pin projection 23 engages the flapper valves 24 and 25 pivoted at 26 and each having a gravitational bias clockwise and counter clockwise respectively to engage and close the discharge thru vents or bleeder outlet nozzles 27 and 28. The nozzle 27 is supplied with air from the driving bellows 29 by means of ducts 30 and 31, the former of which also leads to balancing bellows 32. In like manner nozzle 28 is supplied with air from driving bellows 33 by means of ducts 34 and 35, the former of which leads to a second opposed balancing bellows 36.

The pair of driving bellows are connected at their opposed ends by a rod 37 having a pin 38 extending therefrom and received by a slot in lever 39 pivoted in the casing at 40. The lever 39 has another slot 41 therein which receives an eccentric pin 42 on a disc 43. The bellows 29 and 33 are alternately compressed and expanded by rotation of the disc 43 mounted on a shaft 44 driven thru suitable gearing 45 from a motor 46. This same motor 46 is used to drive chart 47, mounted on a hub (not shown) in the casing, at a suitable rate of, for example, once every twenty-four hours.

The alternate expansion and contraction of the balancing bellows 32 and 36, when this is permitted in a manner to be later described, is used to move a contact member 48 over a resistance 49. This is accomplished by mounting contact 48 on one arm of a bell crank 50 which is pivoted at 51, the other arm of the bell crank having an off-set extension with rack teeth 52 formed thereon. The bellows 32 has a rod 53 attached to its end for movement therewith and pivoted to the outer end of the rod 53 is a pawl 54 for engaging with teeth 52. In a like manner bellows 36 has a rod 55 attached to its end, to the other end of which is pivoted a pawl 56 for engaging other of the teeth 52. A throttling range selector is provided for adjusting the amount of follow-up movement given to lever 21 by a given angular movement of bell crank 50 and consists of a calibrated dial 57 to which is attached a lever 58, the two being mounted for pivotal movement in the casing. Pivotally attached to the outer end of lever 58 is another lever 59 which has a pin 60 in its outer end. This pin extends between lever 21 and bell crank 50 and its position of contact between the two levers may be changed by rotating dial 57.

In the operation of the relay the lever 21 is normally positioned, when the temperature is at the desired value, so that the lever 19 is horizontal and pin 23 prevents either flapper 24 or 25 from contacting the nozzles 27 or 28, therefore both nozzles are open. As the motor 46 rotates to reciprocate rod 37 the driving bellows 29 and 33 are alternately compressed and since the nozzles are unobstructed air can be exhausted thru them and there is no movement of the balancing bellows 32 or 36. If, however, the temperature to which bulb 6 is subjected increases, helix 8 will be expanded to move link 11 to the left and bellcrank 12 clockwise. Such a movement will cause lever 15 to be lifted and in turn move link 18 upward and lever 19 with pin 23 clockwise around pivot 20. This permits flapper 24 to move toward nozzle 27 under its gravity bias and close the nozzle so that when bellows 29 is next contracted air cannot escape therethru. As a consequence balancing bellows 32 is expanded forcing rod 53 and pawl 54 to the left to move bell crank 50 clockwise and shift contact 48 downwardly along resistance 49. This motion is transmitted to lever 21, the lower end of which is moved to the right by spring 22a thus moving lever 19 and pin 23 to the right to open nozzle 27 and again restore the system to equilibrium. In a like manner if there is a decrease in the temperature of bulb 6 the balancing bellows 36 is expanded to move contact 48 upward along resistance 49 and force levers 21 and 19 to the left to restore equilibrium to the system.

Angular adjustments of the bell crank 50, in a manner above described, move contact 48 along resistance 49 to control the adjustment of the heater supply valve 4 and gives the latter adjustment movements proportional to the adjustment movements of the bellcrank 50 and contact 48.

The proportioning means comprise a portion forming a part of the control instrument and located with the instrument casing 1, and a larger portion external to the casing 1 and connected to the instrument portion only by electrical conductors extending through the instrument casing wall. The portion of the proportioning means within the instrument casing comprises an electrical resistance 49, ordinarily, and as shown, wound into a helical coil on a supporting body of insulating material, and so disposed that as the contact 48 moves through its range of oscillation, it will engage the resistance conductor 49 at successively different points along its length, the particular point engaged at any time being dependent on the angular position of bell-crank 50 and contact 48 at the time. Conductors 61 and 62 are connected to the ends of the resistance conductor 49 and a conductor 63 is connected to the switch or contact 48. The conductors 61, 62, and 63, are conveniently included in a single cable extending through a part 64 mounted in an opening in the instrument casing body, such as is customarily employed in instruments having casing enclosed parts electrically connected to external apparatus.

Externally of the instrument casing, the conductors 61 and 62 are connected to the ends of a resistance 65 curved in a circle about the axis of a rotatable shaft 66 carrying a contact or switch arm 67 engaging the resistance 65 at different points along the length of the latter as the angular position of the shaft 66 is adjusted. The resistances 49 and 65, conductors 61, 62, and 63, and contacts 48 and 67, form parts of a Wheatstone bridge arrangement which is energized by a transformer 68, the terminals of the secondary winding of that transformer being connected by conductors 69 and 70 to the conductors 61 and 62, respectively. The terminals of the primary winding of the transformer 68 are connected to alternating current supply conductors $L^1$ and $L^2$, which may form a part of any available alternating current supply system of customary commercial voltage for lighting and power purposes.

As diagrammatically shown, the shaft 66 is the armature shaft of a reversing motor including a rotor 71 and cooperating winding 72, and a second rotor 73 and cooperating winding 74, the shaft 66 being rotated in one direction when the winding 72 is energized, and in the opposite direction when the winding 74 is energized, as hereinafter described. One terminal of the winding 72 is connected through a limit switch 75 and a conductor 76 to the bridge conductor 62, to which one terminal of the winding 74 is also connected through the conductor 76 and a limit switch 77. The second terminal of the winding 72 is connected to a switch contact 78, and the second terminal of the winding 74 is connected to a switch contact 79. A pivoted switch member 80, connected by a conductor 81 to the bridge conductor 61, is movable between one end position in which it engages the contact 78, and thereby connects the winding 72 between the bridge conductors 61 and 62, and a second end position in which it engages the contact 79 and thereby connects the winding 74 between the bridge conductors 61 and 62.

The switch 80 forms part of a proportioning relay, comprising an armature 82 connected to the switch 80, so as to oscillate the latter when the armature 82 is given longitudinal reciprocating movements. It is given such movements by changes in the relative values of the currents flowing in the coils 83 and 84, which are arranged end to end and in inductive relation with the armature 82. The coils 83 and 84 are connected in series with one another between the conductors 61 and 62, and their adjacent terminals are connected by a conductor 85 to the bridge conductor 63.

In any condition of stable operation, the currents flowing through the relay coils 83 and 84 will be equal, and the armature 82 and the switch 80 will each be in its neutral position. Any deflection of the bell-crank 50 and contact 48 will make the currents flowing through the coils 83 and 84, unequal, and will result in an operation of the reversing motor which will adjust the contact 67 as required to rebalance those currents. For example, on a deflection of the contact 48 in the counter-clockwise direction, corresponding to a decrease in the temperature of the bulb 6 below its normal value, the current flowing through the relay coil 84 will be increased relative to the current flow through the coil 83. In consequence, the armature 82 will be shifted to the right, bringing the pivoted switch 80 into engagement with the contact 79, and thereby energizing the motor winding 74. The rotor 73 will then rotate the shaft 66 in the counter-clockwise direction until the resultant movement of the contact 67 makes the sum of the portion of the resistance 65 between the contact 67 and conductor 62 and in the portion of the resistance 49 between the contact 48 and the conductor 61, equal to the sum of the other portions of the resistances 49 and 65, whereupon the currents flowing through the relay coils 83 and 84 will be again equalized, and the armature 82 will be returned to its mid position. Any adjustment of the contact 48 in either direction, thus produces a corresponding proportional adjustment of the contact 67 in one direction or the other.

The switches 75 and 77 are actuated by the rotation of the shaft 66 to perform the usual limit switch function of preventing overtravel of the armature shaft in either direction which would carry the contact 67 beyond the corresponding end of the resistance 65. As such motor limit switches are in common use, there is no occasion to illustrate or describe the connections through which the switches 75 and 77 are actuated by the shaft 66. As diagrammatically shown, the shaft 66 carries a worm 86 engaging the teeth of the worm gear segment 87 mounted on the operating shaft of the fuel valve 4 so that the latter is angularly adjusted in the opening or closing direction, as the bell-crank 50 deflects clockwise or counter-clockwise, respectively, from its neutral position.

As shown, branch conductors 88 and 89 from the supply conductors L¹ and L², form the energizing conductors for the motor 46, and are included in a cable passing through the part 64. The latter is also formed with a passage for the tube 7 connecting the thermometer bulb to the helix 8.

While the essential ultimate elements of the apparatus have now been described, the control instrument includes practically necessary or desirable construction and adjustment features not previously mentioned. To vary the normal temperature of the bulb 6 which the apparatus tends to maintain, means are provided for adjusting the fulcrum pivot 16 for the lever 15. As shown that pivot is carried by a bell crank lever 90 angularly adjustable about the pen axis 13, and adapted to be so adjusted by a link 91 connecting the lever 90 to a crank arm 92. The latter is carried by a rock shaft journaled in the instrument structure adjacent its periphery and adapted for angular adjustment by a screw driver engaging a kerf 93 in the front end of the shaft. The mounting of the shaft is such that it is frictionally held in any position into which it is adjusted. Angular adjustment of the lever 90 will not disturb the position of the pen arm 14, but will give a longitudinal adjustment to the link 18 and thereby effect an angular adjustment of the flapper valve operating lever 19 about its pivot 20, with the result of changing the angular position of the bell crank 50 assumed for any particular position of the pen arm 14. An indicating arm 94 may be secured to the lever 90 for the purpose of indicating on the record chart 47, the normal temperature which the apparatus is adjusted to maintain.

What instrument control range adjustment will give the best control results in furnace regulation or in the regulation of practically any industrial process or operation, will depend upon various factors, as those skilled in the control art will understand, and in particular, will depend upon the extent and rapidity of load changes tending to changes in the quantity measured, and on the rate of response to control changes. For example, in one installation, the total normal variation in furnace load or heat requirement, may be between a minimum and a maximum 50% larger than the minimum, while in another installation, the normal and to be expected maximum heat requirement may be several hundred per cent of the minimum heat requirement. A given change in the rate of fuel supply may produce a significant effect on the controlling temperature in five minutes in one installation, and in twenty minutes in another installation.

As a result of such variations in operating conditions, proper regulation, and the avoidance of an objectionable hunting tendency, may require that on a given change of load, the controlling temperature should be permitted to depart much more widely from the desired normal temperature in one installation than in another installation.

In general, the control range or adjustment of the bell-crank 50 and contact 48 may advantageously be greater for a given variation from normal of the controlling temperature, when conditions permit variations in that temperature to be kept relatively small, than when conditions require that the maximum permitted controlling temperature variation should be relatively large. The wide variation in control range effected by adjustment of the member 21 in the instrument shown in Fig. 1, permits the instrument to be adjusted or calibrated to have the control range giving the best regulating results in installations having very different control requirements. For most uses of such apparatus as is shown in Fig. 1, there will be a certain normal or average load requirement, and ordinarily the best results are obtainable in such case, with the parts adjusted so that in stable operation with the normal load, the bell-crank 50 will be in or near its mid position. To that end, the contact 67 and the spindle of the control valve 4 may well be relatively adjustable, as by angular adjustment of the contact 67 relative to the reversing motor shaft 66, so that when the contact 67 is in its mid position, the flow capacity of the fuel valve 4 will be that required to supply heat at the normal furnace load rate. In general, changes in operating conditions making desirable any significant change in the adjustment of the part 21, will also make desirable adjustment of the contact 67 relative to the shaft 66.

In order to reverse the direction of operation of the valve 4 for a given change in temperature it is only necessary to attach link 18 to the right end of lever 19 instead of to the left end as shown. This may be desirable in some cases for a particular condition or type of valve used.

In any instrument comprising a pneumatic power device or relay mechanism for adjusting some instrument device or mechanism in accordance with the movements of a sensitive movable measuring element, there are certain general advantages in placing a compressor, supplying air under pressure for the actuation of the power device or relay mechanism, in the instrument casing, so that the air compressed and used may be continuously held within the casing, and hence does not require filtering or give rise to difficulties as a result of the condensation of the water vapor with the air, or as a result of pressure drop and time lag due to the flow of the pressure air through elongated piping supplying air to the instrument from an external source of compressed air. The conception of an arrangement of the compressor within an instrument casing to obtain the general advantages just mentioned, did not originate with me, but with Roy Ullman, and is disclosed and claimed in his Patent 2,172,599, issued on September 19, 1939.

In combining an air compressor within the instrument casing, with control means of the proportioning type herein illustrated, I obtain special advantages, however, in respect to instrument compactness and simplification, and in respect to the simple and positive manner in which the control switch lever is given its movements, by means of a relatively small amount of air compressed only to a relatively moderate pressure.

While in accordance with the provisions of the statutes I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In a control instrument, a member responsive to a variation in a condition to be controlled, relay means for adjusting said condition, said means including a pair of oppositely disposed driving bellows, means for alternately compressing said bellows, a pair of regulating bellows having inner bellows spaces connected respectively to the inner bellows spaces of said driving bellows, a nozzle in each connection between the driving bellows and regulating bellows adapted when closed to permit expansion of the corresponding regulating bellows upon compression of a driving bellows, a resistance, a contact movable along said resistance, means for moving said contact by the expansion of either regulating bellows, means for regulating said condition by movement of said contact and means for controlling the opening of said nozzles by said member.

2. In a control instrument, a member responsive to variations in a condition, means for controlling said condition in response to movements of said member, said means including a proportioning control system comprising in part a contact and a resistance, a pulsating pneumatic relay controlled by said member for moving said contact along said resistance, driving means for said relay consisting of a pair of oppositely disposed bellows and means for alternately compressing and expanding said bellows to supply driving fluid for said relay.

3. In a control instrument, the combination with a member, means responsive to variations in a condition for deflecting said member, proportioning control means including an electrical resistance and a contact, a fluid pressure relay mechanism for adjusting said contact along said resistance, said mechanism comprising a pair of alternately expanding and contracting bellows, means to alternately expand and contract said bellows and a part acted upon individually by the expansion of said bellows to adjust said contact in one direction or the other, means to control movement of said part by said bellows in response to the deflection of said member, and means to regulate said condition by said adjustment.

4. In a control instrument, the combination with a member, means responsive to variations in a condition for deflecting said member, proportioning control means including an electrical resistance and a contact, a fluid pressure relay mechanism for adjusting said contact along said resistance, said mechanism comprising a pair of alternately expanding and contracting driving bellows, a nozzle connected with each bellows, a flapper valve for each of said nozzles, means connected with said member adapted to permit one or the other of said valves to close its respective nozzle upon a variation in said condition a pair of balancing bellows responsive to movement of said valves and means individually operated by the latter pair of bellows to adjust said contact along said resistance.

5. In a control instrument, the combination with a member, means responsive to variations in a condition for deflecting said member, proportioning means including an electrical resistance and a contact, a fluid pressure relay mechanism for adjusting said contact along said resistance, said mechanism comprising a part for adjusting said contact along said resistance in one direction or the other, a pair of balancing bellows each adapted to move said part in one direction, a pair of alternately expansible and contractible driving bellows connected to said balancing bellows and means controlled by movement of said member to permit or prevent the movement of said part by said balancing bellows.

6. In a control instrument, a pneumatic relay comprising a pair of nozzles, a pair of bellows for supplying fluid to said nozzles, a flapper valve for each nozzle, a member responsive to variations in a measurable condition, means connected to said member for movement thereby to permit said valves to close said nozzles, a resistance and a contact movable thereover, a part for moving said contact and means actuated by fluid supplied by one of said bellows when its nozzle is closed to move said part in one direction, and means actuated by fluid supplied by said other bellows when its nozzle is closed to move said part in another direction.

7. In a control instrument, a casing, a self-contained pneumatic relay contained therein comprising in combination, a motor, a pair of opposed bellows, means driven by said motor for alternately expanding and contracting said bellows, a pair of nozzles and a pair of balancing bellows, one of each being connected to each driving bellows, means for covering said nozzles whereby as the driving bellows are contracted the corresponding balancing bellows is expanded, a resistance and a contact moving thereover, a part for supporting said contact, and means actuated by said balancing bellows as they expand for moving said part.

8. In a control system, a member, means responsive to the variation of a condition for moving said member, a link and lever connected for movement with said member, a driving bellows, means for alternately expanding and contracting said bellows, a nozzle and a balancing bellows connected with said driving bellows, a flapper valve for said nozzle, a projection on said lever engaging said valve, whereby upon a change in said condition said member will move said projection to permit said valve to close said nozzle and upon subsequent contraction of said driving bellows the balancing bellows will be expanded, and means for returning said lever to its initial position upon expansion of said balancing bellows.

9. In a control instrument, a member, means responsive to variations in a condition for deflecting said member, proportioning control means comprising in part an electrical resistance and a contact moving thereover, a pulsating pneumatic relay, connecting means between said relay and member for moving said contact in accordance with movements of said member, driving means for said relay comprising a pair of oppositely disposed bellows and means for alternately contracting and expanding said bellows to supply driving fluid to said relay.

10. In a control instrument, a member movable in response to variations in a controlled condition, a pair of alternately compressible bellows, means for compressing said bellows, proportioning means comprising an electrical resistance and a contact, a pair of regulating bellows connected respectively to said driving bellows, means controlled by movement of said member in response to a variation of said condition to cause expansion of one of said regulating bellows upon compression of its driving bellows, means to move said contact over said resistance, said moving means being actuated by said regulating bellows, and means to adjust said condition responsive to movement of said contact.

11. In a control instrument, the combination with an instrument casing, of instrument mechanism mounted within said casing and comprising a member adapted to deflect in accordance with changes in a quantity measured, an adjustable device, pneumatic relay means controlled by said member and adapted to adjust said device, a pair of alternately compressible bellows adapted to supply air under pressure to said relay means, and a motor for compressing said bellows.

12. In a control instrument, proportioning means comprising a resistance and a contact adapted to move thereover, a pivoted lever to which said contact is attached, rack teeth on said lever, a pair of opposed regulating bellows, a pawl adapted to engage said rack teeth attached to each bellows, a member movable in response to variations in a condition, means controlled by movements of said member to permit expansion of one or the other of said bellows whereby upon expansion of said bellows said pawl will engage said rack teeth to move said lever and adjust said contact along the resistance, and means to control said condition by said adjustment.

13. In a control instrument, a compressible driving bellows, a bleed nozzle and a balancing bellows connected thereto, means for periodically compressing said driving bellows, a flapper valve for closing said nozzle, a member responsive to variations in a condition, means permitting said valve to close said nozzle upon movement of said member whereby upon subsequent contraction of said driving bellows said balancing bellows will be expanded and means operable by expansion of said balancing bellows to return said valve to its initial position.

14. In an instrument, an element to be positioned, alternately acting opposed air motors adapted to position said element, a pulsating source of fluid under pressure connected to said air motors, bleed valve means affecting communication of the pressure of said source to said air motors and means adapted to control said bleed valve means in accordance with the fluctuations of a variable condition.

15. In a control instrument a pair of cooperating control elements, a member deflecting in accordance with variations in a variable condition, means for relatively adjusting said control elements including a pair of alternately acting opposed air motors to perform such adjustment, a pulsating source of fluid under pressure, a pair of valves communicating with said source and said motors, means controlled by said member and adapted to control the relative positions of said valves and thereby vary the relative effect of said motors upon said elements and means responsive to adjustment of said elements for effecting a readjustment of said valves.

16. The combination of claim 15 and means for varying the readjustment of said valve in response to a given air motor action.

17. In a control instrument, a member responsive to variations in a condition, means controlling said condition in response to movements of said member, said means including a proportioning system comprising a movable part, a pulsating pneumatic relay controlled by said member for moving said part, driving means for said relay, a pair of oppositely disposed bellows and means for alternately compressing and expanding said bellows to supply driving fluid for said driving means.

EDWIN C. WIEGMANN.